(12) United States Patent
Hasegawa et al.

(10) Patent No.: US 11,630,894 B2
(45) Date of Patent: Apr. 18, 2023

(54) PROCESSING DEVICE, SYSTEM, AND AUTHENTICATION DEVICE FOR SECURE AUTHENTICATION BETWEEN DEVICES

(71) Applicant: KABUSHIKI KAISHA TOKAI RIKA DENKI SEISAKUSHO, Aichi (JP)

(72) Inventors: Yosuke Hasegawa, Aichi (JP); Yosuke Ohashi, Aichi (JP); Takanori Matsuyama, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/234,071

(22) Filed: Apr. 19, 2021

(65) Prior Publication Data
US 2021/0382980 A1 Dec. 9, 2021

(30) Foreign Application Priority Data
Jun. 4, 2020 (JP) .............................. JP2020-097776

(51) Int. Cl.
*G06F 21/44* (2013.01)
*G06F 21/30* (2013.01)

(52) U.S. Cl.
CPC .......... *G06F 21/445* (2013.01); *G06F 21/305* (2013.01)

(58) Field of Classification Search
CPC ............ G06F 21/60; G06F 21/445; G06F 2221/2103; G06F 21/305; G06F 21/31; H04L 9/3271; H04L 63/08; H04L 2209/76; H04W 12/06; H04W 12/08
See application file for complete search history.

(56) References Cited

U.S. PATENT DOCUMENTS

| | | | | |
|---|---|---|---|---|
| 8,370,509 B2* | 2/2013 | Faynberg | .............. | H04W 12/06 726/13 |
| 9,268,932 B2* | 2/2016 | Dhand | ................ | H04L 63/0492 |
| 9,729,619 B2* | 8/2017 | Kuwako | ................. | H04L 67/10 |
| 10,142,331 B2* | 11/2018 | Ye | ....................... | H04L 63/0492 |
| 10,313,131 B2* | 6/2019 | Keser | ...................... | H04W 4/48 |
| 2018/0027147 A1* | 1/2018 | Decugis | .............. | B41J 2/17543 347/86 |
| 2018/0212781 A1* | 7/2018 | Keser | ...................... | H04W 4/48 |
| 2019/0332464 A1* | 10/2019 | Nakamura | ............ | G06F 9/3877 |
| 2019/0332763 A1* | 10/2019 | Berler | ................... | H04L 9/3271 |
| 2021/0250764 A1* | 8/2021 | Ha | ........................ | H04W 12/40 |

FOREIGN PATENT DOCUMENTS

JP 2019-193112 10/2019

* cited by examiner

*Primary Examiner* — Lizbeth Torres-Diaz
(74) *Attorney, Agent, or Firm* — Greenblum & Bernstein, P.L.C.

(57) ABSTRACT

To provide a structure capable of performing more secure authentication between devices.
There is provided a processing device comprising: a processing unit that executes a defined process that is defined in advance according to an input first request, executes calculation using first information included in the first request, and transmits a first response including a result of the calculation to a first device having output the first request, wherein the processing unit transmits a second request including second information different from the first information to at least one second device different from the first device, and acquires a second response including a result of calculation using the second information from the at least one second device.

5 Claims, 6 Drawing Sheets

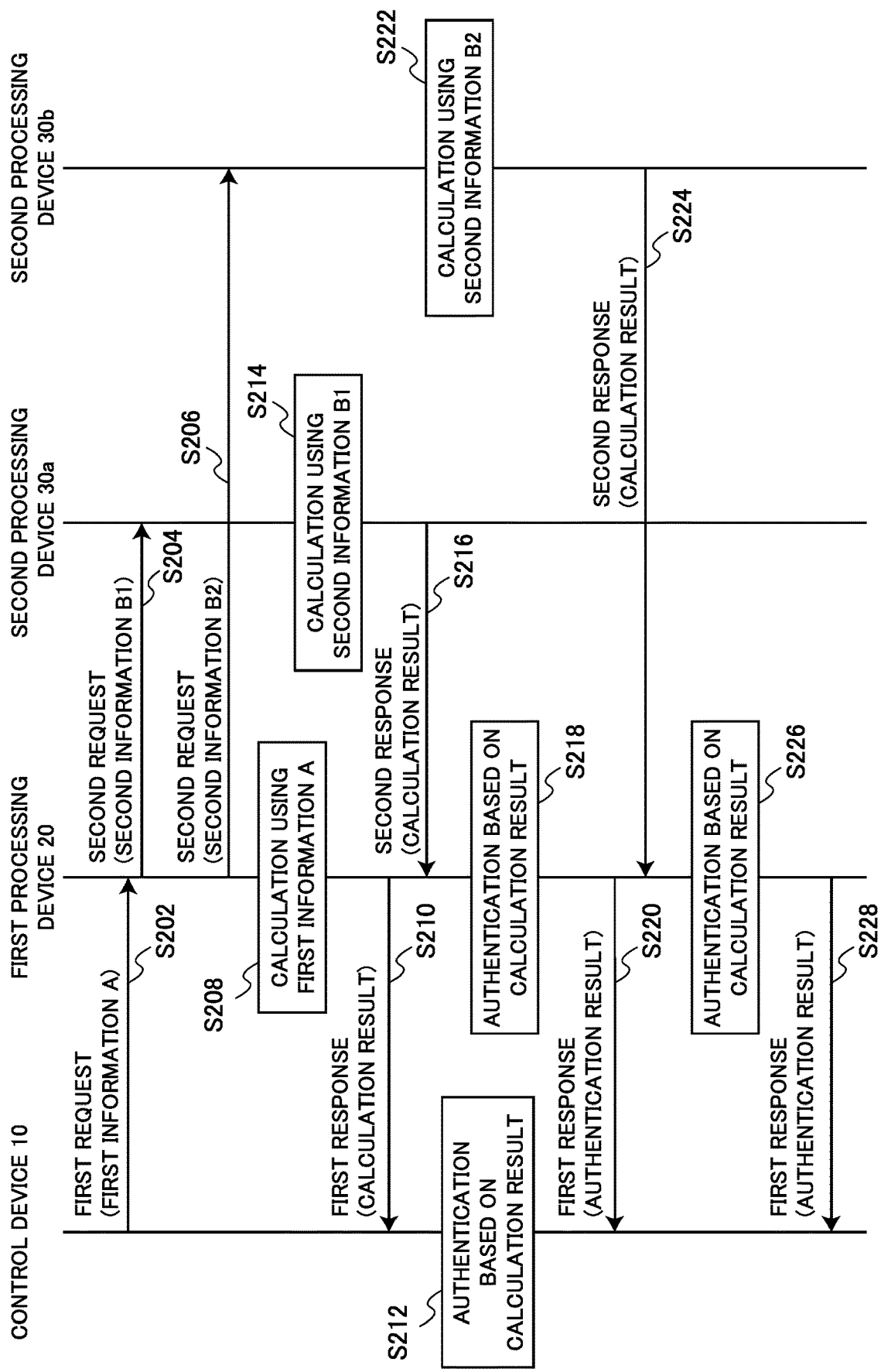

PROCESSING DEVICE, SYSTEM, AND AUTHENTICATION DEVICE FOR SECURE AUTHENTICATION BETWEEN DEVICES

CROSS REFERENCE TO RELATED APPLICATION(S)

This application is based upon and claims benefit of priority from Japanese Patent Application No. 2020-097776, filed on Jun. 4, 2020, the entire contents of which are incorporated herein by reference.

BACKGROUND

The present invention relates to a processing device, a system, and a authentication device.

In recent years, many systems that operate through cooperation among a plurality of devices have been developed. For example, Japanese Unexamined Patent Application Publication No. 2019-193112 discloses a system including a master and a plurality of slaves.

SUMMARY

However, a system performing a cooperative operation may perform authentication between devices configuring the system. In this case, there is a demand for a structure for performing more secure authentication between devices.

Therefore, the present invention has been made in light of the above-described problem, and an object of the present invention is to provide a structure capable of performing more secure authentication between devices.

To solve the above described problem, according to an aspect of the present invention, there is provided a processing device comprising: a processing unit that executes a defined process that is defined in advance according to an input first request, executes calculation using first information included in the first request, and transmits a first response including a result of the calculation to a first device having output the first request, wherein the processing unit transmits a second request including second information different from the first information to at least one second device different from the first device, and acquires a second response including a result of calculation using the second information from the at least one second device.

To solve the above described problem, according to another aspect of the present invention, there is provided a system comprising: a first device; at least one second device that is different from the first device; and a processing unit that executes a defined process that is defined in advance according to a first request acquired from the first device, executes calculation using first information included in the first request, and outputs a first response including a result of the calculation to the first device, wherein the processing unit transmits a second request including second information different from the first information to the at least one second device, and acquires a second response including a result of calculation using the second information from the at least one second device.

To solve the above described problem, according to another aspect of the present invention, there is provided an authentication device comprising: a processing unit that transmits a first request including first information to another device, and performs authentication of the other device on the basis of a result of calculation using the first information included in a first response transmitted in response to the first request from the other device, wherein the processing unit acquires a result of authentication based on a result of calculation using second information different from the first information.

As described above, according to the present invention, it is possible to provide a structure capable of performing more secure authentication between devices.

BRIEF DESCRIPTION OF THE DRAWINGS

FIG. 6 is a sequence diagram illustrating an example of a flow of processes performed by the system 1 according to the embodiment of the present invention.

DETAILED DESCRIPTION OF THE EMBODIMENT(S)

Figure 1:
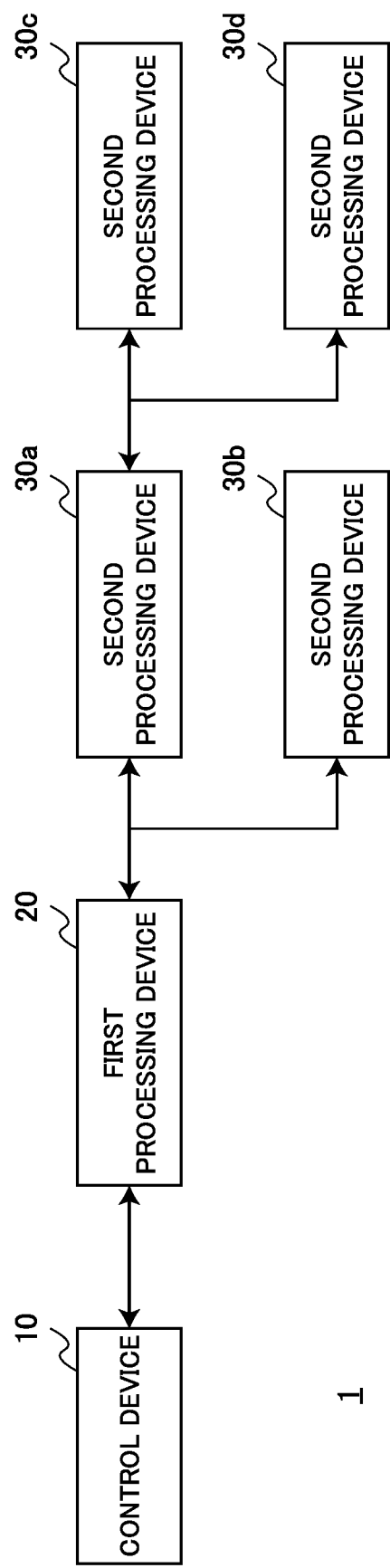
FIG. 1 is a block diagram illustrating a configuration example of a system 1 according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Embodiment

<<1.1. System configuration example>>

First, a configuration example of a system 1 according to an embodiment of the present invention will be described. FIG. 1 is a block diagram illustrating a configuration example of a system 1 according to an embodiment of the present invention. As illustrated in FIG. 1, the system 1 according to the present embodiment includes a control device 10, a first processing device 20, and a plurality of second processing devices 30. FIG. 1 exemplifies a case where the system 1 includes four second processing devices 30a to 30d.

(Control Device 10)

The control device 10 according to the present embodiment integrally controls devices mounted in a casing to which the system 1 is applied.

For example, the control device 10 according to the present embodiment may function as a authentication device that transmits a first request including first information to another device, and performs authentication of the other device on the basis of a result of calculation using the first information included in a first response transmitted in response to the first request from the other device.

An example of another device may be the first processing device 20. In this case, the control device 10 transmits the first request to the first processing device 20, and performs authentication of the first processing device 20 on the basis of a result of calculation using the first information included in the first response transmitted in response to the first request from the first processing device 20.

In this case, the control device 10 according to the present embodiment may further acquire a result of calculation using second information different from the first information or a result of authentication based on the result of calculation.

The control device 10 according to the present embodiment may control devices other than the devices provided in the system 1. For example, a case is assumed in which the casing is a moving object such as a vehicle, and the system 1 is a system enabling the moving object to realize a wireless communication function. In this case, the control device 10 may perform control related to opening and closing of a door provided in the moving object or starting of an engine on the basis of a result of the wireless communication.

(First processing Device 20)

The first processing device 20 according to the present embodiment is an example of a processing device that executes a defined process that is defined in advance, according to the input first request.

The first processing device 20 according to the present embodiment executes calculation using the first information included in the input first request, and transmits the first response including a result of the calculation to a first device that has output the first request.

For example, in a case of the example illustrated in FIG. 1, the first device may be the control device 10. In this case, the first processing device 20 according to the present embodiment executes calculation using the first information included in the first request that is input from the control device 10, and transmits the first response including a result of the calculation to the control device 10.

The first processing device 20 according to the present embodiment transmits a second request including second information different from the first information to at least one second device different from the first device, and acquires a second response including a result of calculation using the second information from the at least one second device.

For example, in a case of the example illustrated in FIG. 1, the second device may be the second processing device 30a or the second processing device 30b.

In this case, the first processing device 20 according to the present embodiment transmits the second request to at least one of the second processing device 30a or the second processing device 30b, and receives the second response from the at least one of the second processing device 30a or the second processing device 30b having received the second request.

The first processing device 20 according to the present embodiment may control at least one second device as a device to be controlled. For example, the first processing device 20 according to the present embodiment may operate as a master that controls at least one second processing device 30 that operates as a slave.

In this case, the first processing device 20 according to the present embodiment may perform authentication of the second device on the basis of the second response and transmit the first response including a result of the authentication to the first device.

For example, in a case of the example illustrated in FIG. 1, the first processing device 20 may perform authentication of the second processing device 30a on the basis of the second information included in the second response received from the second processing device 30a and transmit the first response including a result of the authentication to the control device 10.

(Second Processing Device 30)

The second processing device 30 according to the present embodiment is an example of a processing device that executes a defined process that is defined in advance according to an input request.

The second processing device 30 according to the present embodiment may operate as the second device.

For example, in a case of the example illustrated in FIG. 1, the second processing devices 30a and 30b may execute calculation using the second information included in the second request received from the first processing device 20 and transmit the second response including a result of the calculation to the first processing device 20.

On the other hand, in the same manner as the first processing device 20, the second processing device 30 according to the present embodiment may operate as a processing device that executes calculation using the first information included in the input first request, transmits the first response including a result of the calculation to the first device, and also transmits the second request including the second information different from the first information to the second device.

For example, in a case of the example illustrated in FIG. 1, the second processing device 30a may execute calculation using the first information included in the first request received from the first processing device 20 that is the first device and transmit the first response including a result of the calculation to the first processing device 20.

In this case, the second processing device 30a may transmit the second request including the second information different from the first information to at least one of the second processing devices 30c and 30d that are second devices and receive the second response from at least one of the second processing devices 30c and 30d having received the second request.

In other words, in the processing device according to the present embodiment, it may be defined that the first request is a request that is input from the outside, and the second request is a request transmitted to the second device from the processing device on the basis of the first request.

<<1.2. Functional Configuration Example of Control Device 10>>

Figure 2:
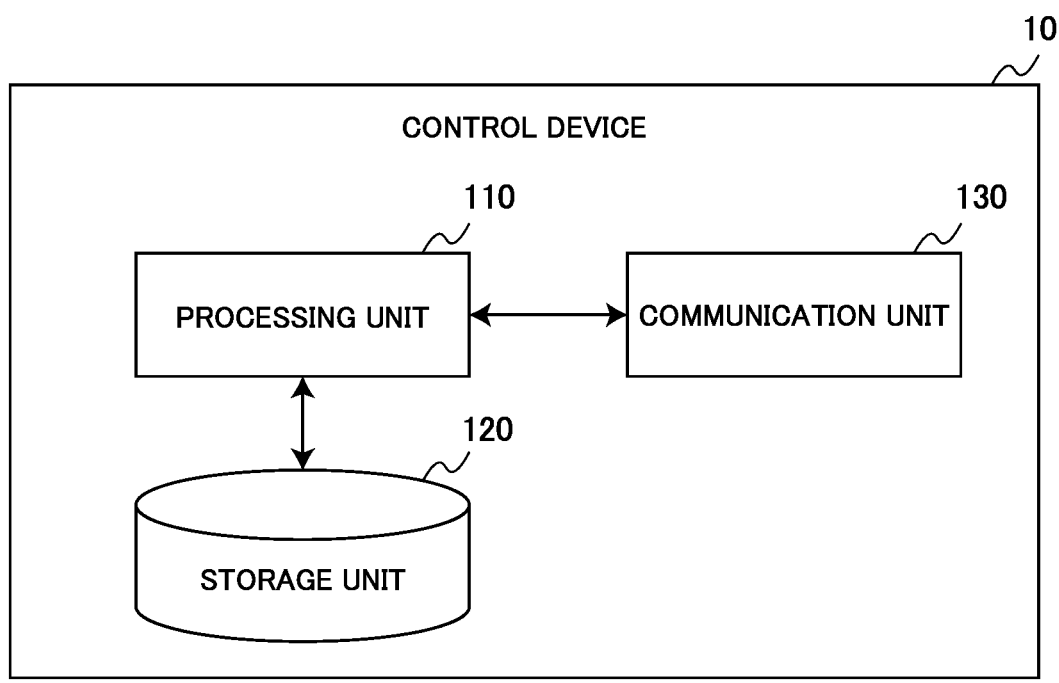
FIG. 2 is a block diagram illustrating a functional configuration example of a control device 10 according to the embodiment.

Next, a functional configuration example of the control device 10 according to the present embodiment will be described. FIG. 2 is a block diagram illustrating a functional configuration example of the control device 10 according to the present embodiment.

As illustrated in FIG. 2, the control device 10 according to the present embodiment may include a processing unit 110, a storage unit 120, and a communication unit 130.

(Processing Unit 110)

The processing unit 110 according to the present embodiment transmits the first request including the first information to another device via the communication unit 130, and performs authentication of another device on the basis of a result of calculation using the first information included in the first response transmitted in response to the first request from another device.

An example of another device may be the first processing device 20.

One feature of the processing unit 110 according to the present embodiment is to acquire a result of authentication based on a result of calculation using the second information different from the first information via the communication unit 130.

The functions of the processing unit 110 according to the present embodiment are realized by various processors. Details of the functions of the processing unit 110 according to the present embodiment will be described later.

(Storage Unit 120)

The storage unit 120 according to the present embodiment stores various pieces of information used by the control device 10. For example, the storage unit 120 stores various programs used in the processing unit 110.

For example, the storage unit 120 stores information used for authentication of another device in the processing unit 110. An example of the information may be a specific value that is uniquely assigned to another device.

(Communication Unit 130)

The communication unit 130 according to the present embodiment performs information communication with another device under the control of the processing unit 110. For example, the communication unit 130 transmits the first request to another device under the control of the processing unit 110. The communication unit 130 receives the first response from another device.

As described above, the functional configuration example of the control device 10 according to the present embodiment has been described. The functional configuration described with reference to FIG. 2 is only an example, and a functional configuration of the control device 10 according to the present embodiment is not limited to such an example. The functional configuration of the control device 10 according to the present embodiment may be flexibly modified according to specifications or operations.

<<1.3. Functional Configuration Example of First Processing Device 20>>

Figure 3:
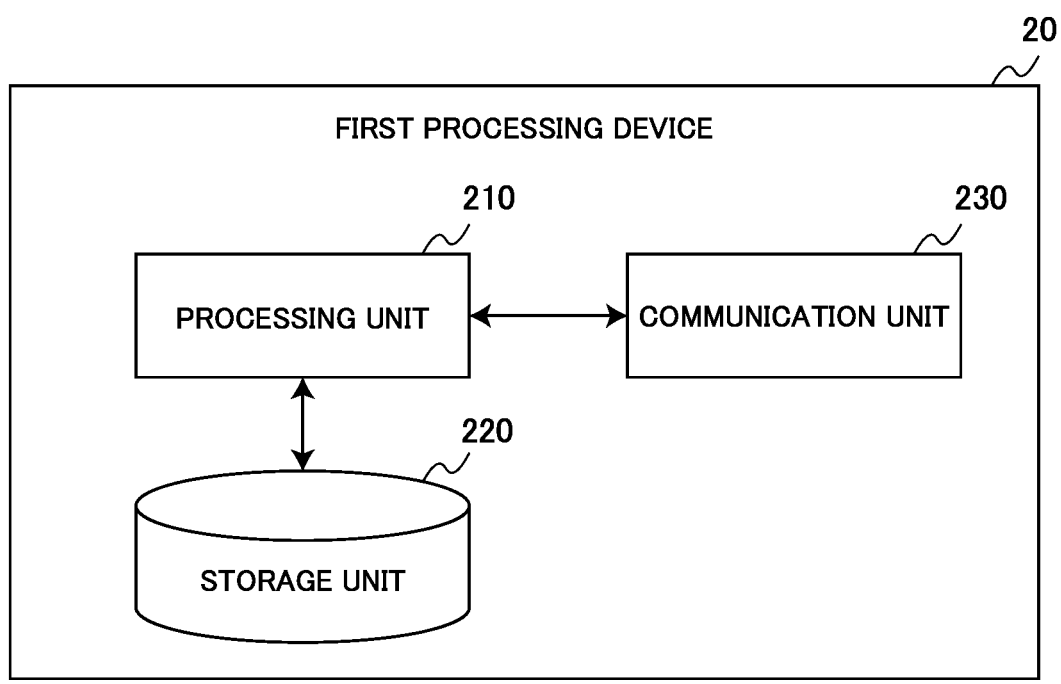
FIG. 3 is a block diagram illustrating a functional configuration example of a first processing device 20 according to the embodiment.

Next, a functional configuration example of the first processing device 20 according to the present embodiment will be described. FIG. 3 is a block diagram illustrating a functional configuration example of the first processing device 20 according to the present embodiment.

As illustrated in FIG. 3, the first processing device 20 according to the present embodiment may include a processing unit 210, a storage unit 220, and a communication unit 230.

(Processing Unit 210)

The processing unit 210 according to the present embodiment executes a defined process that is defined in advance according to the input first request.

The processing unit 210 according to the present embodiment executes calculation using information included in the first request, and transmits, via the communication unit 230, the first response including a result of the calculation to the first device having output the first request.

The processing unit 210 according to the present embodiment transmits the second request including the second information different from the first information to at least one second device via the communication unit 230, and acquires the second response including a result of calculation using the second information from at least one second device via the communication unit 230.

The processing unit 210 according to the present embodiment may perform authentication of the second device on the basis of the second response and transmit the first response including a result of the authentication to the first device.

The first device may be the control device 10. The second device may be the second processing device 30.

The functions of the processing unit 210 according to the present embodiment are realized by various processors. Details of details of the processing unit 210 according to the present embodiment will be described later.

(Storage Unit 220)

The storage unit 220 according to the present embodiment stores various pieces of information used by the first processing device 20. For example, the storage unit 220 stores various programs used in the processing unit 210.

For example, the storage unit 220 stores information used for calculation in the processing unit 210. An example of the information may be a specific value that is uniquely assigned to the first processing device 20.

For example, the storage unit 220 stores information used for authentication of the second device in the processing unit 210. An example of the information may be a specific value that is uniquely assigned to the second device.

(Communication Unit 230)

The communication unit 230 according to the present embodiment performs information communication with the first device or the second device under the control of the processing unit 210. For example, the communication unit 230 receives the first request from the first device, and transmits the first response to the first device. For example, the communication unit 230 transmits the second request to the second device, and receives the second response from the second device.

As described above, the functional configuration example of the first processing device 20 according to the present embodiment has been described. The functional configuration described with reference to FIG. 3 is only an example, and a functional configuration of the first processing device 20 according to the present embodiment is not limited to such an example. The functional configuration of the first processing device 20 according to the present embodiment may be flexibly modified according to specifications or operations.

<<1.4. Functional Configuration Example of Second Processing Device 30>>

Figure 4:
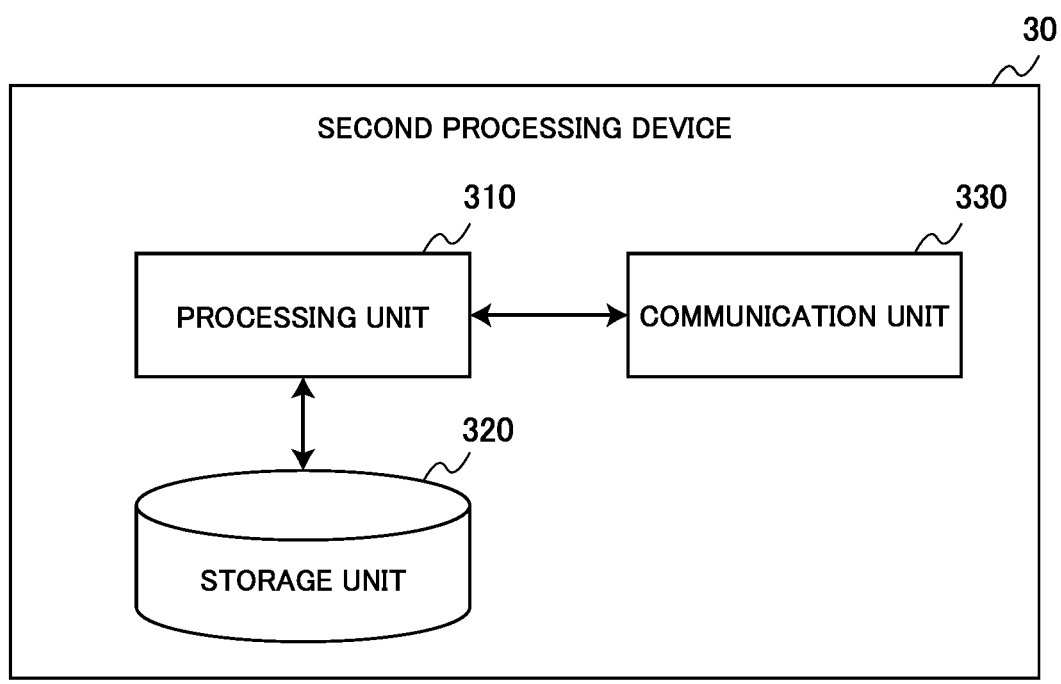
FIG. 4 is a block diagram illustrating a functional configuration example of a second processing device 30 according to the embodiment.

Next, a functional configuration example of the second processing device 30 according to the present embodiment will be described. FIG. 4 is a block diagram illustrating a functional configuration example of the second processing device 30 according to the present embodiment.

As illustrated in FIG. 4, the second processing device 30 according to the present embodiment may include a processing unit 310, a storage unit 320, and a communication unit 330.

(Processing Unit 310)

The processing unit 310 according to the present embodiment executes a defined process that is defined in advance according to an input request. In this case, the processing unit 310 executes calculation by using information included in the request, and transmits a response including a result of the calculation to a device having output the request via the communication unit 330.

The processing unit 310 according to the present embodiment may perform authentication of a device having output a response on the basis of information included in the response that is received via the communication unit 330.

(Storage Unit 320)

The storage unit 320 according to the present embodiment stores various pieces of information used by the second processing device 30. For example, the storage unit 320 stores various programs used in the processing unit 310.

For example, the storage unit 320 stores information used for calculation in the processing unit 310. An example of the information may be a specific value that is uniquely assigned to the second processing device 30.

For example, the storage unit 320 stores information used for authentication of another device in the processing unit 310. An example of the information may be a specific value that is uniquely assigned to another device.

(Communication Unit 330)

The communication unit 330 according to the present embodiment performs information communication with another device under the control of the processing unit 310. For example, the communication unit 330 receives a request from the first processing device 20, and transmits a response to the first processing device 20. For example, the communication unit 330 transmits a request to another second processing device 30, and receives a response from another second processing device 30.

As described above, the functional configuration example of the second processing device 30 according to the present embodiment has been described. The functional configuration described with reference to FIG. 4 is only an example, and a functional configuration of the second processing device 30 according to the present embodiment is not limited to such an example. The functional configuration of the second processing device 30 according to the present embodiment may be flexibly modified according to specifications or operations.

<<1.5. Flow of Processes>>

Next, a flow of processes in the system 1 according to the present embodiment will be described in detail. In the system 1 according to the present embodiment, a request output from the control device 10 is acquired by a plurality of processing devices according to a flow of data, and each of the processing devices executes a defined process based on the request.

An example of the defined process may include a registration process for performing a cooperative operation between, for example, the control device 10 and the processing device.

More specifically, the processing device according to the present embodiment may execute calculation using information included in a request, and execute the registration process for performing the cooperative operation in a case where authentication based on a result of the calculation is established.

According to the flow of such processes, the plurality of processing devices acquiring a request from the control device 10 according to a flow of data can sequentially execute the registration process and can thus improve processing efficiency as a whole.

However, as in the system 1 according to the present embodiment, in a system in which processing devices sequentially execute calculation, and the processing devices are subjected to authentication based on a result of the calculation, a case is assumed in which common information is used for the calculation performed by each processing device.

In this case, if the information used for the calculation in each processing device is intercepted, spoofing or the like using the information may be possible.

Here, in order to describe features of the system 1 according to the present embodiment, a flow of processes in a comparison target system 7 in which common information is used for calculation performed by each processing device will be described first.

Figure 5:
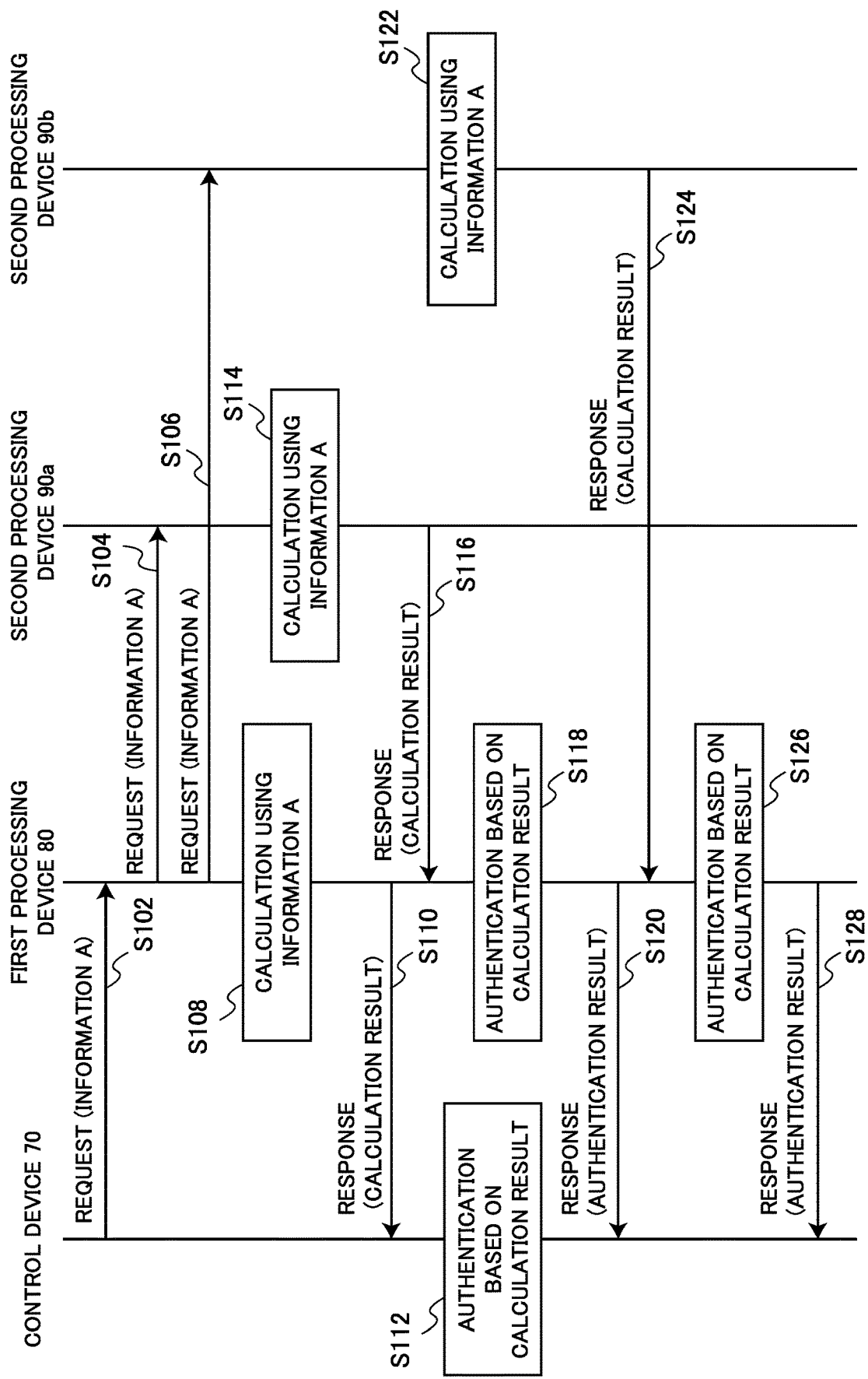
FIG. 5 is a sequence diagram illustrating an example of a flow of processes performed by a comparison target system 7.

FIG. 5 is a sequence diagram illustrating an example of a flow of processes in the comparison target system 7. In the example illustrated in FIG. 5, the comparison target system 7 includes a control device 70 corresponding to the control device 10 according to the present embodiment, a first processing device 80 corresponding to the first processing device 20 according to the present embodiment, and second processing devices 90a and 90b corresponding to the second processing devices 30 according to the present embodiment.

In the example illustrated in FIG. 5, each of the second processing devices 90a and 90b is connected to the first processing device 80 to be able to perform information communication.

In this case, as illustrated in FIG. 5, first, the control device 70 transmits a request including information A to the first processing device 80 (S102).

Next, the first processing device 80 receiving the request in step S102 transmits the same information as the information included in the request, that is, the request including the information A to the second processing device 90a (S104).

Similarly, the first processing device 80 transmits the request including the information A to the second processing device 90b (S106).

Next, the first processing device 80 executes calculation using the information A included in the request received in step S102 (S108).

The first processing device 80 transmits a response including a result of the calculation executed in step S108 to the control device 70 (S110).

The control device 70 receiving the response from the first processing device 80 in step S110 performs authentication of the first processing device 80 on the basis of the calculation result included in the response (S112).

Similarly, the second processing device 90a executes calculation using the information A included in the request received in step S104 (S114).

The second processing device 90a transmits a response including a result of the calculation executed in step S114 to the first processing device 80 (S116).

The first processing device 80 receiving the response from the second processing device 90a in step S116 performs authentication of the second processing device 90a on the basis of the calculation result included in the response (S118).

The first processing device 80 transmits a response including a result of the authentication related to the second processing device 90a executed in step S118 to the control device 70 (S120).

Similarly, the second processing device 90b executes calculation using the information A included in the request received in step S106 (S122).

The second processing device 90b transmits a response including a result of the calculation executed in step S122 to the first processing device 80 (S124).

The first processing device 80 receiving the response from the second processing device 90b in step S124 performs authentication of the second processing device 90b on the basis of the calculation result included in the response (S126).

The first processing device 80 transmits a response including a result of the authentication related to the second processing device 90b executed in step S126 to the control device 70 (S128).

As mentioned above, the flow of the processes in the comparison target system 7 has been described. As described above, in the comparison target system 7, each processing device performs calculation by using the common information A and is subjected to authentication on the basis of a result of the calculation.

Thus, in a case where the information A is illegally obtained by a third party, it may be possible to imitate a result of calculation using the information A and spoof an approved processing device.

The technical spirit according to the present invention was conceived by paying attention to the above points, and makes it possible to more securely realize a series of authentications performed for each combination of devices.

Thus, in the system 1 according to the present embodiment, each processing device may perform calculation using different information.

FIG. 6 is a sequence diagram illustrating an example of a flow of processes in the system 1 according to the present embodiment. In the example illustrated in FIG. 6, the system 1 according to the present embodiment includes the control device 10, the first processing device 20, and the second processing devices 30*a* and 30*b*.

In the example illustrated in FIG. 6, each of the second processing devices 30*a* and 30*b* is connected to the first processing device 20 to be able to perform information communication.

In this case, as illustrated in FIG. 6, first, the processing unit 110 of the control device 10 transmits a first request including first information A to the first processing device 20 via the communication unit 130 (S202).

Next, the processing unit 210 of the first processing device 20 transmits, via the communication unit 230, a second request including second information B1 different from the first information A included in the first request received via the communication unit 230 in step S202, to the second processing device 30*a* (S204).

The processing unit 210 of the first processing device 20 transmits a second request including second information B2 different from the first information A included in the first request to the second processing device 30*b* via the communication unit 230 (S206).

As described above, the processing unit 210 according to the present embodiment may make the second information included in the second request to be transmitted to the respective second devices (here, the second processing devices 30*a* and 30*b*) different.

According to such control, it is possible to perform more secure authentication based on results of calculation executed by the respective second devices.

On the other hand, the processing unit 210 may transmit the second request including the same second information to the respective second devices. For example, the second information included in the second request transmitted to the respective second devices from the processing unit 210 may be the same for each predefined group.

Next, the processing unit 210 of the first processing device 20 executes calculation using the first information A included in the first request received via the communication unit 230 in step S202 (S208).

The processing unit 210 may execute calculation using, for example, the first information A, a specific value uniquely assigned to the first processing device 20, and a preset computation formula.

The processing unit 210 of the first processing device 20 transmits a first response including a result of the calculation executed in step S208 to the control device 10 via the communication unit 230 (S210).

Next, the processing unit 110 of the control device 10 performs authentication of the first processing device 20 on the basis of the calculation result included in the first response received via the communication unit 130 in step S210 (S212).

The processing unit 110 may execute calculation using the first information A, the specific value uniquely assigned to the first processing device 20, and a preset computation formula, and may determine that the authentication is established in a case where a result of the calculation matches the calculation result included in the first response received in step S210.

Similarly, the processing unit 310*a* of the second processing device 30*a* executes calculation using the second information B1 included in the second request received via the communication unit 330*a* in step S204 (S214).

The processing unit 310*a* may execute calculation using, for example, the second information B1, a specific value uniquely assigned to the second processing device 30*a*, and a preset computation formula.

The processing unit 310*a* of the second processing device 30*a* transmits a second response including a result of the calculation executed in step S214 to the first processing device 20 via the communication unit 330*a* (S216).

Next, the processing unit 210 of the first processing device 20 performs authentication of the second processing device 30*a* on the basis of the calculation result included in the second response received via the communication unit 230 in step S216 (S218).

The processing unit 210 may execute calculation using, for example, the second information B1, the specific value uniquely assigned to the second processing device 30*a*, and a preset computation formula, and may determine that the authentication is established in a case where a result of the calculation matches the calculation result included in the second response received in step S216.

Next, the processing unit 210 of the first processing device 20 transmits the first response including a result of the authentication executed in step S218 to the control device 10 via the communication unit 230 (S220).

Similarly, the processing unit 310*b* of the second processing device 30*b* executes calculation using the second information B2 included in the second request received via the communication unit 330*b* in step S206 (S222).

The processing unit 310*b* may execute calculation using, for example, the second information B2, a specific value uniquely assigned to the second processing device 30*b*, and a preset computation formula.

The processing unit 310*b* of the second processing device 30*b* transmits the second response including a result of the calculation executed in step S222 to the first processing device 20 via the communication unit 330*b* (S224).

Next, the processing unit 210 of the first processing device 20 performs authentication of the second processing device 30*b* on the basis of the calculation result included in the second response received via the communication unit 230 in step S224 (S226).

The processing unit 210 may execute calculation using, for example, the second information B2, the specific value uniquely assigned to the second processing device 30*b*, and a preset computation formula, and may determine that the authentication is established in a case where a result of the calculation matches the calculation result included in the second response received in step S224.

Next, the processing unit 210 of the first processing device 20 transmits the first response including a result of the authentication executed in step S226 to the control device 10 via the communication unit 230 (S228).

As described above, the example of the flow of the processes in the system 1 according to the present embodiment has been described in detail. According to the flow of the processes in the system 1 related to the present embodiment, for example, even in a case where information included in a request is intercepted by a third party, it is possible to effectively prevent an approved processing device from being spoofed by using the information.

In the above description, the example of the flow of the processes in a case where the system 1 includes the two second processing devices 30*a* and 30*b* has been described, but a configuration of the system 1 according to the present embodiment is not limited to such an example.

For example, as illustrated in FIG. 1, the system 1 according to the present embodiment may further include the second processing devices 30*c* and 30*d* receiving a request from the second processing device 30*a* according to a flow of data.

In this case, the second processing device 30*a* may transmit a request including information different from information included in a request received from the first processing device 20, to each of the second processing devices 30*c* and 30*d*.

In this case, the second processing device 30*a* may perform authentication of each of the second processing devices 30*c* and 30*d* on the basis of a result of calculation included in a response received from each of the second processing devices 30*c* and 30*d*.

In other words, the second processing device 30*a* in the above example functions as a processing device and a authentication device according to the present invention.

In the above example, the second processing device 30*a* is a second device for the first processing device 20, and the first processing device 20 is a first device for the second processing device 30*a*.

As described above, the processing device, the authentication device, the first device, and the second device according to the present invention do not need to be provided independently, and a single device may simultaneously serve as some of the devices.

2. Appendix

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

A series of processes performed by each device described in the present specification may be realized by using any of software, hardware, and a combination of the software and the hardware. A program configuring the software is stored in advance in, for example, a recording medium (non-transitory medium) provided inside or outside each device. Each program is read to a RAM, for example, when the program is executed by a computer, and is executed by a processor such as a CPU. The recording medium is, for example, a magnetic disk, an optical disc, a magnetooptical disc, or a flash memory. The computer program may be distributed via, for example, a network instead of using the recording medium.

What is claimed is:

1. A first processing device, comprising:
a processor; and
a memory that stores instructions, which when executed by the processor, causes the processor to
execute a defined process that is defined in advance according to an input first request received from a control device,
execute a first calculation using first information included in the input first request, and
transmit a first response from a first processing device, including a result of the first calculation, to the control device having output the input first request, wherein the control device authenticates the first processing device, and
wherein the first processing device
transmits a second request, including second information different from the first information, to at least one second processing device different from the first device,
acquires a second response, including a result of a second calculation, using the second information from the at least one second processing device,
performs authentication of the at least one second processing device on the basis of the second response, and
transmits the first response, including a result of the authentication of the at least one second processing device, to the control device.

2. The first processing device according to claim 1, wherein the first processing device makes the second information, included in the second request transmitted to the at least one second processing device different from the first processing device.

3. The first processing device according to claim 1, wherein the at least one second processing device is controlled as a device to be controlled.

4. A system, comprising:
a first processing device;
at least one second processing device that is different from the first processing device; and
a processor included in the first processing device that
executes a defined process that is defined in advance according to a first request acquired from a control device,
executes a first calculation using first information included in the acquired first request, and
outputs a first response including a result of the calculation to the control device,
wherein the processor included in the first processing device
transmits a second request, including second information different from the first information, to the at least one second processing device, and
acquires a second response, including a result of a second calculation using the second information, from the at least one second processing device,
performs authentication of the at least one second processing device on the basis of the second response, and
transmits the first response, including a result of the authentication of the second processing device, to the control device.

5. An authentication device, comprising:
a processor; and
a memory that stores instructions, which when executed by the processor, causes the processor to
transmits a first request including first information to a first processing device,
performs authentication of the first processing device on the basis of a result of a first calculation using the first information included in a first response transmitted to the authentication device in response to the first request from the authentication device, wherein the first processing device acquires a result of authentication based on a result of a second calculation using second information different from the first information,
authenticates a second processing device based on the result of the second calculation, and
transmits the first response, including a result of the authentication of the second processing device, to the control device.

* * * * *